United States Patent

Tanikoshi

[15] 3,696,719
[45] Oct. 10, 1972

[54] AUTOMATIC EXPOSURE CONTROL DEVICE
[72] Inventor: Kinji Tanikoshi, Tokyo, Japan
[73] Assignee: Canon Kabushiki Kaisha, Tokyo, Japan
[22] Filed: Feb. 17, 1971
[21] Appl. No.: 116,029

[30] Foreign Application Priority Data

Feb. 26, 1970 Japan ..................45/16748

[52] U.S. Cl. .................95/10 CD, 95/64 D, 352/141
[51] Int. Cl. .........................G03b 9/06, G03b 19/18
[58] Field of Search ....95/10 C, 10 CE, 10 CD, 64 R, 95/64 D; 352/141

[56] References Cited

UNITED STATES PATENTS

| 3,426,662 | 2/1969 | Sevin..................95/10 CD |
| 3,476,028 | 11/1969 | Yasuhiro Namba et al. ...................95/10 CD X |
| 3,539,252 | 11/1970 | Gleason, Jr..........95/10 CD X |

FOREIGN PATENTS OR APPLICATIONS 1,283,096  12/1961  France ...................95/10 CD Primary Examiner—Joseph F. Peters
Attorney—Toren and McGeady

[57] ABSTRACT

In the device disclosed, a first amplifier is composed of a plurality of cascaded emitter follower stages. A photoelectric transducer serves as an input by being connected as one emitter load. An inverting stage in the amplifier feeds the output at the last emitter follower to the first to compress input signals. A second amplifier is composed of a plurality of cascaded emitter follower stages. Each stage includes an emitter circuit in the form of a variable resistor that can be set on the basis of photographic information and provide a separate input. An inverting stage in the amplifier feeds the output of the last emitter follower to the first to compress the input signals. A comparator compares the outputs of the amplifiers. Driving means responsive to the comparator adjust the diaphragm in front of the transducer.

7 Claims, 1 Drawing Figure

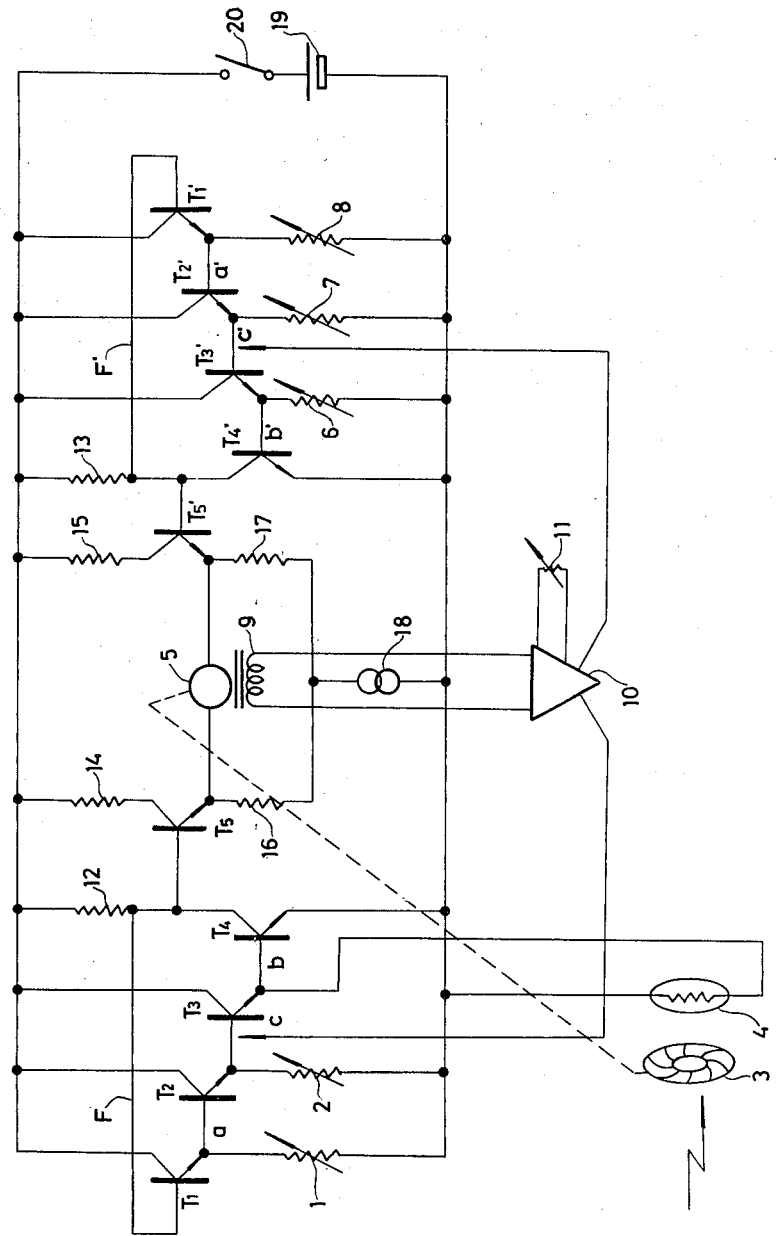
PATENTED OCT 10 1972  3,696,719
INVENTOR.
KINJI TANIKOSHI
BY
Torem and McGeady
ATTORNEYS

AUTOMATIC EXPOSURE CONTROL DEVICE

BACKGROUND OF THE INVENTION

The present invention relates to an automatic exposure control device for a cine-camera or the like.

The invention particularly relates to a control device wherein an input circuit, similar to the photometric circuit of the storage type electric shutter control proposed in the Ser. No. 107,637 filed Jan. 19, 1971, is used to drive the means such as a diaphragm to control a light quantity.

An object of the invention is to enter various kinds of photographic information signals into the operation of an exposure control device.

SUMMARY OF THE INVENTION

According to features of the invention, the exposure control device includes a first series circuit having transistors and containing a photoelectric transducing element and exhibiting a compression characteristic caused by feedback, a second series circuit having transistors, containing variable elements for setting photographic informations on exhibiting a compression characteristic caused by feed-back, and control means to control the light quantity, driven according to the difference between both out-puts of said first and second series circuits, whereby the light in-put into said photoelectric transducing element is controlled by the control means.

Below the present invention will be explained in detail referring to the drawings which show an embodiment of the present invention.

The attached drawing shows a circuit diagram of an embodiment of the automatic exposure control device according to the present invention.

DESCRIPTION OF PREFERRED EMBODIMENTS

In the drawing, a variable resistor 1 is set to correspond to the sensitivity of a film. A variable resistor 2 is set to correspond to a shutter speed of the camera within which this system is used. A diaphragm 3 controls the light, received from an object being photographed, and passing to a photoelectric transducing element 4 such as a photoconductive element or the like. A driving device 5 drives the diaphragm 3 to control the light input to the photoelectric transducing element 4. A variable resistance 6 is set to correspond to a color balance filter. A variable resistance 7 is set to correspond to the number of pictures per unit time, and a variable resistance 8 for other adjustments. A detecting device 9 serves for detecting a damping or braking value which is fed to a DC amplifier that also performs a braking or damping function. A variable resistance 11 in the amplifier 10 adjusts the braking or damping performed by the amplifier. Four transistors $T_1$, $T_2$, $T_3$, and $T_4$ form a four-stage cascade circuit each stage being composed of an emitter follower. A feed-back F is connected between the collector of $T_4$ and the base of $T_1$ so that the variations in the variable resistances 1, 2 and 4 are compressed and applied to the base of a transistor $T_5$. Similarly four transistors $T'_1$, $T'_2$, $T'_3$ and $T'_4$ for part of the second series circuit, wherein a feed-back F' is connected between the collector of $T'_4$ and the base of $T'_1$ so that the variations in the variable resistors 6, 7 and 8 are compressed and applied to the base of a transistor $T'_5$. Reference characters 12 and 13 respectively represent the load resistors to the first and the second series circuits, 14, 15, 16 and 17 resistors, and 18 an electrical source with constant current. A battery 19 or other electrical source energizes the system through a main switch 20. Terminals C and C' apply the counter electromotive forces corresponding to the rotational speed of the driving device 5, and being detected by the damping coil 9, to the first and the second series circuit through the amplifier 10. The terminal C can be connected either to the lead wire $a$ or to the lead wire $b$, while the terminal C' can be connected either to the lead wire $a'$ or with the lead wire $b'$.

The variable resistors 1, 2, 6, 7 and 8 can be increased or decreased in number, as needed. Various variants of the setting informations are also possible. For example, according to an embodiment of the invention two photoelectric transducing elements are connected in place of resistors 1 and 8. One photoelectric transducing element is set to receive light flux having nothing to do with image formation while the other photoelectric transducing element is set to receive light flux intimately related to image formation. This is done to produce an exposure control device that responds to the distribution of the object brightness automatically. A device with which a proper exposure can be obtained even when taking pictures at sea shore or under backlight can then be obtained. According to another embodiment of the invention either the feed-back F or the feed-back F' are furnished with a conductive transistor or the like whose conductivity is controlled by a time-constant circuit. This produces an automatic fader by making use of the charging and the discharging characteristics of the time-constant circuit.

Because the composition of the circuit is symmetrical, the device is stable even when the temperature varies over a wide range. Similarly the symmetrical character of the circuit prevents it from being influenced by the variation in the electrical voltage of the electrical source.

By reducing the adjustable parts such as variable resistances operated from outside, the device as a whole can be minimized in size because the circuit can easily be embodied as an integrated circuit chip. If, for example, only the photoelectric transducing elements, the sensitivity of film, the number of pictures per unit time, and the shutter angle are controlled with the adjusting resistances, only five terminals are needed for these resistances. Two terminals are needed for the servomotor as driving mechanism, one terminal for the electrical source and eventually two after terminals for the damping so that an integrated circuit unit with at ten terminals will do. This contributes greatly to the miniaturization of cine-camera or the like.

In short, the present invention has many excellent possibilities such as to introduce many kinds of information signals for taking pictures, to process various kinds of information signals, further to minimize the size of the device and so on.

Further if the integrated circuit that is used for the electric shutter control circuit with a storage device or for the electronic shutter release without storage, is designed in advance so as to include the device according to the present invention, it becomes very profitable for mass production from the standpoint of quality and costs.

While embodiments of the invention have been described in detail it will be obvious to those skilled in the art that the invention may be embodied otherwise without departing from its spirit and scope.

What is claimed is:

1. An automatic exposure device, comprising a diaphragm, first amplifier means, photoelectric transducing means responsive to light through said diaphragm and connected to said amplifier means for forming input signals to said amplifier means on the basis of the light impinging upon said transducing means, said first amplifier means including compressor means for compressing input signals applied to said amplifier means, said compressor means including negative feedback means, second amplifier means, a plurality of variable means connected to said second amplifier means and responding to variable photographic conditions for furnishing the input signals corresponding to the variable photographic conditions to said second amplifier means, said second amplifier means including second compressor means for compressing input signals to said second amplifier means, said second compressor means including negative feedback means in said second amplifier means, a comparator circuit responsive to said first amplifier means and said second amplifier means, and driving means for changing the opening of said diaphragm in response to the output of said comparator circuit.

2. A device as in claim 1, further comprising detecting means responsive to the operation of said driving means for detecting the driving force of the driving means, and feedback control means responsive to said detecting means and connected to each of said amplifier means for feeding back a signal corresponding to the force detected by said detecting means to each amplifier means so as to vary the control of said driving means.

3. An automatic exposure control device for a diaphragm, comprising a first amplifier circuit including a plurality of cascaded emitter follower stages, a photoelectric transducing element located behind the diaphragm so as to respond to light through the diaphragm, said element being connected in said amplifier as the emitter load of one of said stages and forming input signals to said first amplifier on the basis of light sensed by said transducing element, said first amplifier circuit including an output stage, said first amplifier circuit including a feedback circuit for feeding the output of the output stage to the input of one of said emitter follower stages, a second amplifier circuit including a plurality of cascaded emitter follower stages, a variable resistance element responsive to photographic information and connected as the emitter load of one of the emitter stages of said second amplifier circuit and forming input signals to said second amplifier circuit on the basis of photographic information, said second amplifier circuit including an output stage, and a feedback circuit for feeding back the output of said output stage of said second amplifier circuit to an input of one of said emitter follower stages of said second amplifier circuit, a comparator circuit for connecting symmetrically the first amplifier circuit and the second amplifier circuit, and driving means for varying the opening of the diaphragm on the bias of the output of said comparator circuit.

4. A device as in claim 3, further comprising detecting means coupled to said driving means for detecting the driving force of said driving means, and control means responsive to said detecting means for applying the output of said detecting means to each of said amplifier means as feedback signals to each of said amplifier means. variable resistance element responsive to photographic information is connected as the emitter load of one of the emitter follower stages of said first amplifier circuit to 5. A device as in claim 4, wherein said detecting means includes electromagnetic detecting means coupled to said driving means.

6. A device as in claim 3, wherein said comparator circuit includes a differential amplifier.

7. A device as in claim 4, wherein a second form input signals to said first amplifier circuit, and wherein a third variable resistance element responsive to photographic information is connected as the emitter load of another one of the emitter follower stages of said second amplifier circuit and forms input signals to said second amplifier circuit, said second and third resistance elements responding to photographic information different than the photographic information of said first variable resistance element and different from the photographic information to each other.

* * * * *